United States Patent [19]

Chuang

[11] Patent Number: 4,706,351

[45] Date of Patent: Nov. 17, 1987

[54] TWIN DISC TYPE TOOL TURRET MECHANISM FOR CNC MACHINES

[76] Inventor: Kuo-Huey Chuang, No. 10, Yuan-Tung Street, Lin 16, Pao-An Li, Chia-Yi City, Taiwan

[21] Appl. No.: 837,393

[22] Filed: Mar. 7, 1986

[51] Int. Cl.$^4$ .............................................. B23B 3/16
[52] U.S. Cl. ........................................ 29/39; 29/35.5; 74/826; 82/25; 82/36 A
[58] Field of Search ...................... 29/39, 35.5, 36, 50, 29/34, 27 C, 27 R; 82/25, 36 A; 408/35; 74/813 R, 813 L, 824, 826, 825

[56] References Cited

U.S. PATENT DOCUMENTS

| | | | |
|---|---|---|---|
| 2,685,122 | 8/1954 | Berthiez | 29/39 X |
| 3,246,543 | 4/1966 | Davidson et al. | 74/826 |
| 3,618,427 | 11/1971 | Schoepe | 74/824 |
| 3,691,613 | 9/1972 | Walk | 29/39 X |
| 3,798,721 | 3/1974 | Schalles | 82/36 A |
| 3,846,912 | 11/1974 | Newbould | 74/813 R |
| 4,055,095 | 10/1977 | Gramespacher et al. | 408/35 |
| 4,087,891 | 5/1978 | Schering | 29/39 X |

FOREIGN PATENT DOCUMENTS

| | | | |
|---|---|---|---|
| 3202042 | 8/1983 | Fed. Rep. of Germany | 82/36 A |
| 119302 | 9/1981 | Japan | 82/36 A |
| 1605143 | 2/1982 | United Kingdom | 29/39 |

Primary Examiner—William R. Briggs
Attorney, Agent, or Firm—Darby & Darby

[57] ABSTRACT

A twin disc type tool turret mechanism for CNC machines including a double layer of tool mounting discs attached respectively to two of a three-piece toothed ring-type registration and lock coupling. The front disc provides a number of mounting slots for external turning tools and the rear disc provides the same number of mounting seats for facing, OD turning or internal boring tools. A drive mechanism combined with a hydraulic control system incorporated in/on the turret housing facilitates unlocking, rotation, and relocking of the discs with the turret housing. The subject turret can also include provisions for attachment of revolving tools with an active spindle and an additional spindle motor for effecting the required processing operations. In addition, both OD and ID probes and a signal transmitting mechanism may be installed in both discs to accomplish in-process measurement of the workpiece.

6 Claims, 7 Drawing Figures

TWIN DISC TYPE TOOL TURRET MECHANISM FOR CNC MACHINES

BACKGROUND OF THE INVENTION

This invention relates to a new tool turret mechanism and more particularly to a twin disc tool turret mechanism for CNC machines with two tool-mounting discs attached separately to a toothed ring-type three piece registration and lock-up coupling device (commercially designated as Curvic or Hirth coupling, hereinafter referred to as "three piece coupling device"). By a special arrangement for tool placement, this mechanism allows doubling of tool quantity on a tool turret without increasing the turret size.

At present, most NC lathes have one or two tool turrets on which a number of either outside (OD) turning or inside (ID) boring tools are mounted. Cutting tools are mounted on a symmetric polygon or circular disc which indexes (including rotating, registering and locking) at the same angulars interval according to the number of tools mounted. The registration and locking mechanism, essential to reproduce the exact coordinate location of the cutting tools, generally uses either a two-piece or a three-piece toothed ring-type coupling device. For machining operations, the desired tool is selected by the indexing mechanism to take up the active position of the tool turret, then the entire turret on a carriage is moved to engage the active tool with the workpiece. Because all tools are mounted on the turret, inactive tools may make contact (interfere) with the workpiece and the workpiece-holding chuck before and/or during the machining operation. This interference may be reduced by special arrangements of tools in relation to the workpiece but cannot be totally eliminated. Therefore, the programmer of the lathe has to take interference into consideration.

On a conventional tool turret, the quantity of tools can be increased only by increasing the size of the tool mounting disc. Increasing the disc size, however, makes the turret heavier, thus harder to move, and a larger disc also slows down the speed of disc rotation. Besides, for any given disc rotational speed, increasing the quantity of tools also increases the average time required for tool changes. For all the reasons mentioned above, the number of tools on most conventional tool turrets is restricted to twelve.

In order to reduce tool interference and to increase tool quantity, the tool turret may be replaced with a single tool holding post, having an automatic tool changing mechanism similar to that of machining centers. This approach, however, is much more complicated and, therefore, more costly than a conventional tool turret.

In addition, a popular factor in recent years is to include a live spindle to perform some secondary machining operations after turning. Provision of touch sensing probes on a tool turret for on-the-machine and in-process measurement of workpiece diameter is also gaining popularity on some newly introduced machines.

All the aformentioned problems are solved and all the desirable functions are provided by this subject invention, which for the sake of generalization is hereby designated as a "Twin Disc Tool Turret Mechanism".

SUMMARY OF THE INVENTION

This invention involves a new tool turret mechanism for CNC machines having two tool mounting discs, a front one and a rear one, attached separately to two pieces of a three piece coupling device. By a special arrangement for tool placement, this mechanism allows doubling of tool quantity on a tool turret without increasing the turret size. The front disc has a number of radially situated mounting slots for OD turning tools, while the rear disc is a polygon having the same number of facets as the front disc has slots, with each facet serving as a seat for mounting of an OD (radial) turning, an ID (axial) boring, a facing or a revolving tools. Both discs are respectively mounted at an end of their related hollow shafts, with the shaft of the front disc passing through the hollow shaft of the rear disc. Situated behind these discs is a locking/unlocking and disc rotating mechanism consisting of: (1) a hydraulic motor operating, (2) two differential gear trains, (3) a hydraulic cylinder and (4) a hydraulic control system for manipulation of the hydraulic fluid. For speedy tool selection, both these discs can rotate in either direction so that the desired tool can be reached in the direction providing a shorter path for speedy tool selection. The OD tools are so arranged that all tools clear from all shanks of ID tools, and one seat on the rear disc is left vacant so that an active OD tool can reach the workpiece without interference from the tool which may otherwise be located at the active position. The configuration of the hollow shafts and the discs is so arranged that cutting fluid is supplied only to the active tool. The turret can also be modified to include a live spindle drive mechanism for actuation of revolving tools to be mounted on the rear disc.

Other advantages and characteristics of this invention will become apparent from the following detailed description, which, taken in conjunction with the annexed drawings, discloses a preferred embodiment of this invention.

DETAILED DESCRIPTION OF THE PREFERRED EMBODIMENT

Referring to FIGS. 1, 1A 1B and 1C, the preferred embodiment of a twin disc tool turret mechanism according to this invention comprises a front external (OD) turning tool mounting disc D1 and a rear tool mounting disc D2, operatively connected to a turret housing unit TH1. The front disc D1 is connected to a first hollow shaft S1, which passes through a second hollow shaft S2 connected to the rear disc D2.

To simplify the illustration, a turret with only twelve tool position discs is described here. There is, however, no reason why the number of tool positions on the disc can not be more or less than twelve.

Figure 1:
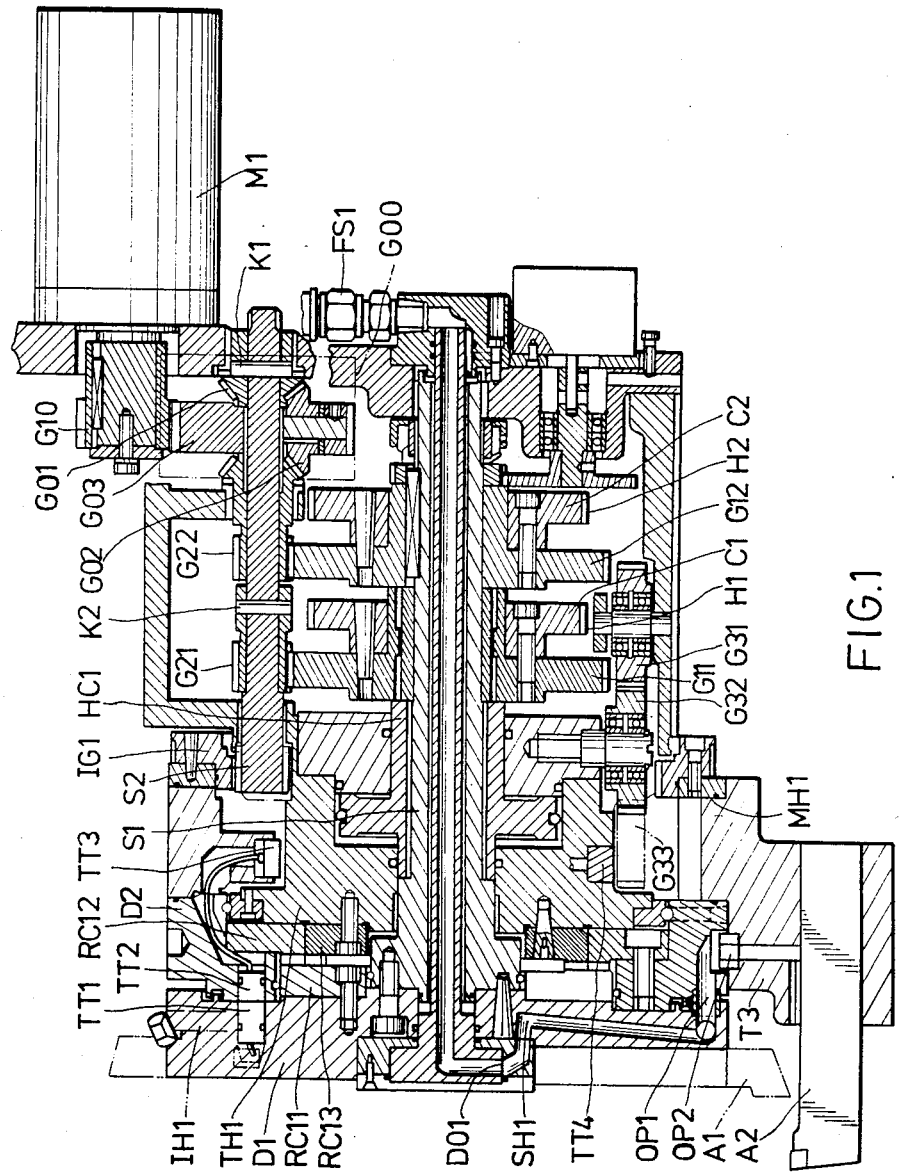
FIG. 1 is a sectional illustrative view of a preferred embodiment of a twin disc tool turret mechanism according to this invention.
Figure 1A:
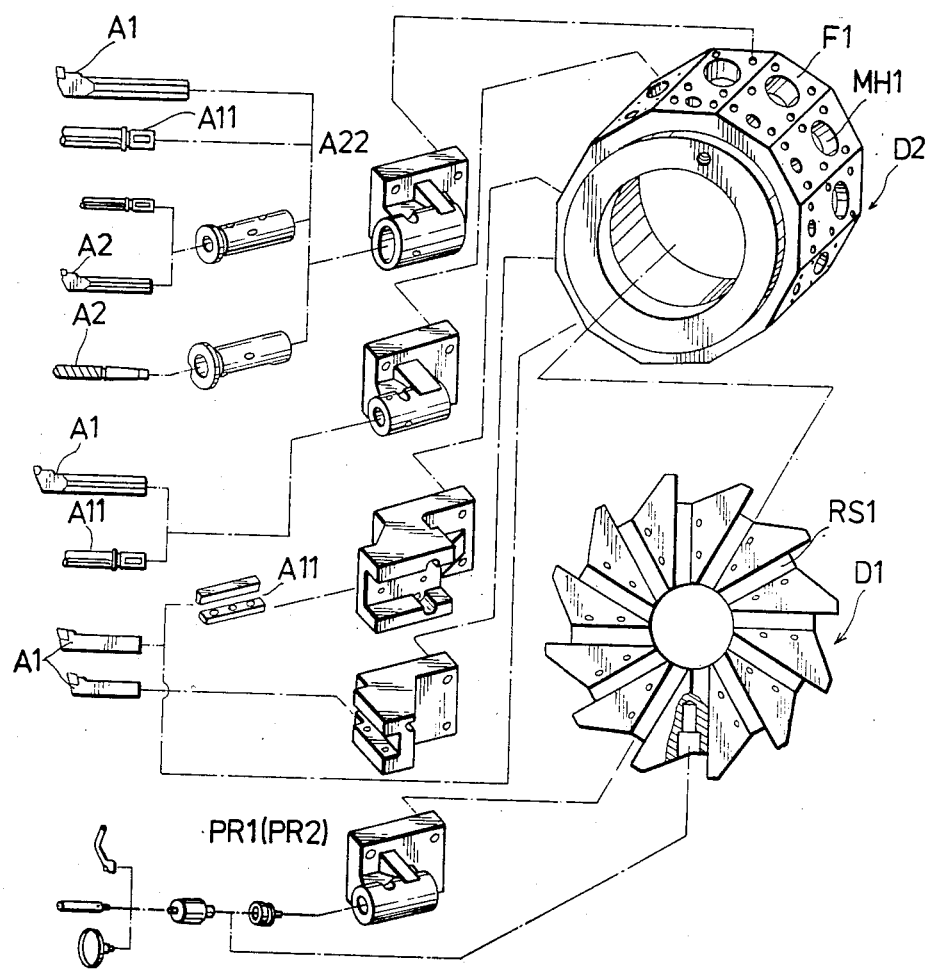
FIG. 1A is a three-dimensional illustrative view of two tool mounting discs embodied in the twin disc tool turret mechanism shown in FIG. 1.

The front disc D1 is provided with twelve radial slots RS1 for mounting OD turning tool (A1) shanks A11 and the rear disc D2 is a dodecahedron, with facets F1 formed on its perimeter for mounting ID boring tool (A2) holders A22 as shown in FIG. 1A. Situated behind these discs is a drive mechanism for rotation of the discs. The drive mechanism consists of a hydraulic motor M1 and a plurality of gears. The gear G10 mounted on the motor shaft is engaged to a differential gear set G00. A bevel gear G01 of the differential gear set G00 is connected to the second shaft S2 and the gear G03 through a key K1.

There are two gears G21 and G22 arranged on the second shaft S2. Gear G21 is connected to the shaft S2 by a key K2 while G22 is an idler gear (only sleeved on the shaft thus is free to rotate) on the second shaft S2, but gear G22 has a built-in bevel gear engaged with the bevel gear G02. Gears G21 and G22 are separately engaged with gears G11 and G12 on the first shaft S1. The gear G12 is keyed to the first shaft S1 while gear G11 is an idler gear (only sleeved on the shaft S1). The gears G11 and G12 are respectively fixed to a pair of cams C1 and C2, and each cam has a plurality of tapered slots H1 and H2 (H1 on C1 and H2 on C2) which respectively correspond through the gear train to the tool mounting positions of both discs D1 and D2 so as to correspond with the lockup of the discs D1 and D2 in tool selection, which, on being finished, one of the tapered locating rods P1 or P2 from a pair of locating valves V1 and V2 is inserted into the aligned slot (H1 for P2 and H2 for P1), and the discs D1 or D2 is thereby locked in position for processing operation. (It shall be appreciated that the quantity of slots separately provided in the cams C1 and C2 differs. In the preferred embodiment, the quantity of slots H1 in cam C1 is nine while the quantity of slots H2 in cam C2 is twelve. The reason for this different arrangement is that the number of slots H1 is coordinated with the gears disposed on the transmission mechanism of the rear disc D2 so that whenever the rear disc D2 is stopped at any exact position, there is a slot H1 (one of the nine slots) exactly aligned with the stopped position of the rear disc D2. However, as cam C2 is installed at the same shaft of the front disc D1, each one of the twelve positions of disc D1 corresponds to one of the twelve slots H2 of cam C2.) The complete insertion of a locating rod into a slot in the cam locks the cam, the related shaft and therefore the disc at the exact position where the selected tool takes the active (cutting) position. Therefore, the engagement and disengagement of the tip of the locating rod P2 into and out of one of the slots H1 and that of the rod P1 out of one of the slots H2, when combined with the ation of the hydraulic cylinder described in the following paragraph, actuate the locking and unlocking of the front and rear discs D1 and D2.

Figure 1B:
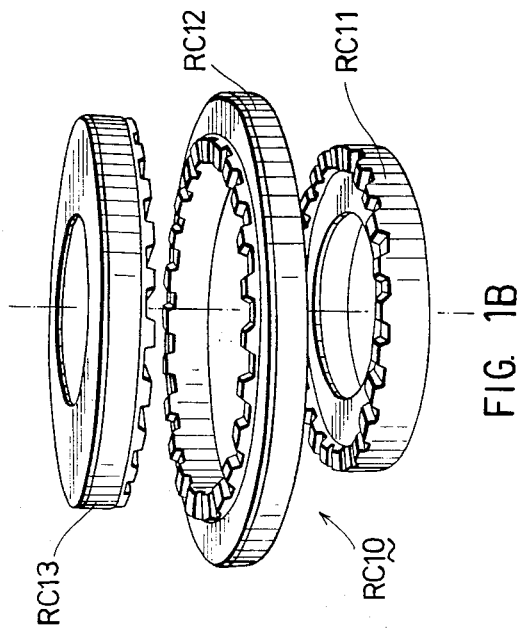
FIGS. 1B and 1C are partial three-dimensional illustrative views of a three piece coupling device, FIG. 1B, and a cam arrangement, FIG. 1C, (2) embodied in the twin disc tool turret mechanism shown in FIG. 1.
Figure 1C:
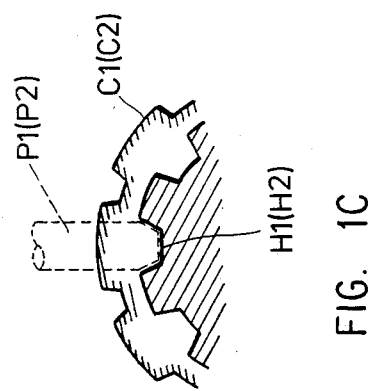

A hydraulic cylinder HC1 is provided on the first hollow shaft S1 to move the shaft in or out therefrom. The mounting discs D1 and D2 are connected to the turret housing TH1 through a three piece coupling device RC10, which consists of an external toothed ring RC12, an internal toothed ring RC13 and a single sided toothed ring RC11 as shown in FIG. 1B. The external toothed ring RC12 is bolted to the rear disc D2, the internal toothed ring RC13 to the turret housing unit TH1 and the single side toothed ring RC11 is bolted to the front disc D1. Unless intentionally disengaged, the single sided toothed ring RC11 is normally in tight engagement with the external toothed ring RC12 and the internal toothed ring RC13.

Figure 2:
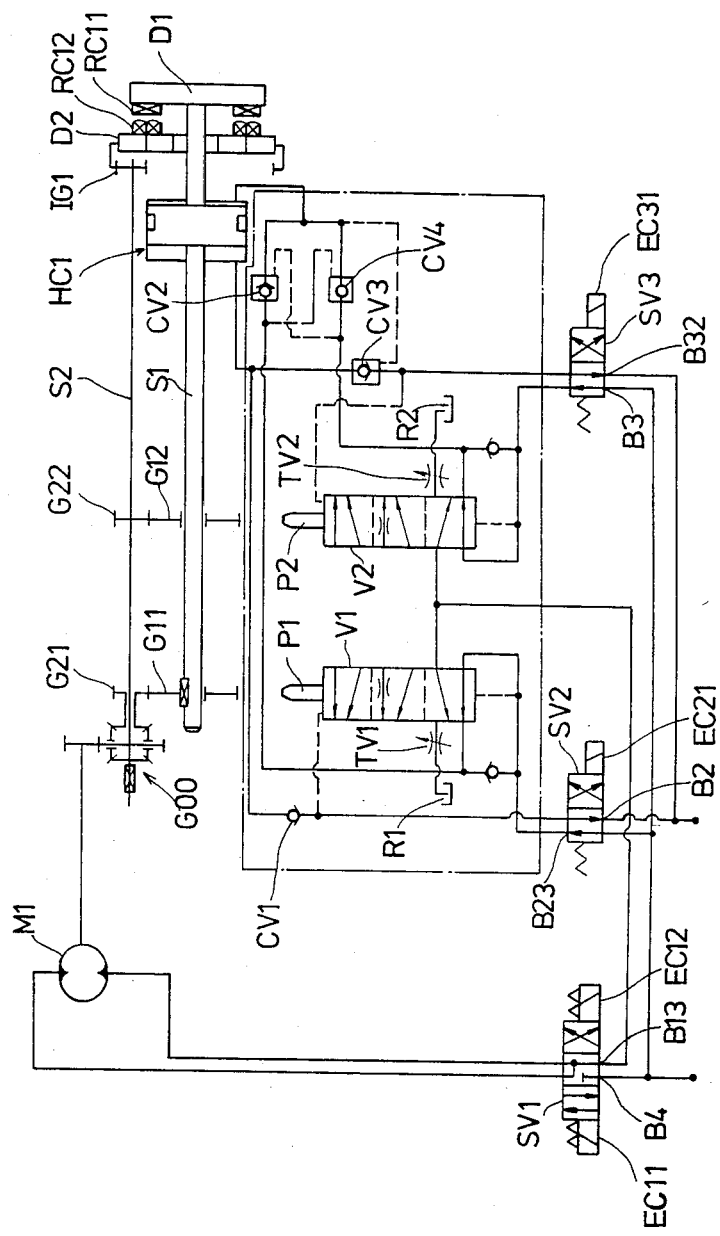
FIG. 2 is an illustrative schematic view of a hydraulic system in the preferred embodiment shown in FIG. 1.

FIG. 2 depicts a schematic hydraulic system of the twin disc tool turret mechanism according to this invention.

The main components of this hydraulic system include a pair of locating valves V1 and V2, each having a locating rod P1, P2. These valves and rods not only switch the flow direction of hydraulic fluid but also activate and deactivate the first and second shafts S1 and S2 through the gear train and cams C2 and C1. The hydraulic motor M1, differential gear G00 and a fluid source FS1 are also depicted. Three solenoid valves SV1, SV2 and SV3 are utilized for control action.

In normal cutting condition, the locating rod P1 of the valve V1 is inserted into the slot H2 of the cam C2 and locating rod P2 of valve V2 into slot H1 of cam C1. as shown in FIG. 1B(2). Both front disc D1 and rear disc D2 are thereby solidly locked.

When the front disc D1 is to be rotated, the coil EC11 or EC12 (depending on the direction desired) of the solenoid valve SV1 and the coil EC21 of the solenoid valve SV2 are activated. Then the hydraulic fluid from the motor M1 passes through a port B2 to pull back the locating rod P1 of valve V1, thereby separating the locating rod P1 from the cam C2. In the meantime, hydraulic fluid flows through a check valve CV1 to activate cylinder HC1 and push the first shaft S1 forward. This motion disengages the single sided toothed ring RC11 from the external toothed ring RC12 and the internal toothed ring RC13. The front disc D1 is then free to rotate.

At the same time, hydraulic fluid passes from source B4 through the motor M1, port B13, valve V1 and a throttle valve TV1 (because the locating rod P1 is already pulled back) to reach a reservoir R1 so as to regulate the revolving speed of the motor M1. Hydraulic motor M1 transmits power to the differential gear set G00. Since the second shaft S2 is locked, and the bevel gear G01 is also locked, the power can only be transmitted from gear G22 to gear G12 via the bevel gear G02 to rotate the first shaft S1, thereby rotating the front disc D1 until a desired tool reaches the active location. Shortly before this time, a rotary limit switch mounted on the disc actuates a relay to deactivate coil EC12 which then diverts the fluid to enter valve V1 via port B23, thereby pushing the rod P1 back into a H2 slot. Meanwhile, the stroking of valve V1 reduces its own internal throttling gap which reduces the quantity of hydraulic fluid reaching the hydraulic motor M1, effectively causing a braking action on the motor. The braking action slows down rotation of the cam C2 to facilitate alignment of the rod P1 with a H2 slot. When rod P1 is inserted into the H2 slot to fix the cam, hydraulic fluid now flows from valve V1 to the pilot check valve CV2 (this pilot check valve is in open state when the rod P2 is pushed out), thus, fluid from valve V1 can now flow through check valve CV2 to actuate the cylinder HC1 in the direction of reengaging the toothed ring RC11 with the other two rings RC12 and RC13 of the three piece coupling device RC10. Now the front disc D1 has the desired tool at the active position and is locked tight against the turret housing unit TH1 for the turning operation.

An additional step to be described in the following paragraph manipulates the rear disc D2 for the vacated seat to assume the active position so that the active OD tool on the front disc D1 can reach a workpiece without interference from a tool on the active position of the rear disc D2.

The tool selection procedure of the rear disc D2 is accomplished in the same manner as that of the front disc D1 described above. When the rear disc D2 is to be rotated, the coil EC11 or EC12 of valve SV1 and the coil EC31 of valve SV3 are activated. The hydraulic fluid from motor M1 passes through a port B32 to pull back the locating rod P2 from cam C1. In the meantime, the hydraulic fluid flows through a check valve CV3 to activate cylinder HC1 and cause the single sided toothed ring RC11 to disengage from the external toothed ring RC12 and the internal toothed ring RC13 so that the rear disc D2 is free to be rotated thereat. Simultaneously, the hydraulic fluid passes from valve SV1 through motor M1, port B13, valve V2 and a throttle valve TV2 to reach the reservoir R2 so as to regulate the revolving speed of motor M1 from which the power is transmitted to differential gear set G00. At the same time, as cam C2 is locked in position by rod P1, the related gear G12 and the first shaft S1 are also locked in position, and the front disc D1 is thereby held inactive thereat. In this condition, since the gear G12 is locked, gears G10 and G03 of the gear train connected to motor M1 for power transmission are also locked. Therefore, the power from motor M1 is transmitted through bevel gear G01 to the second shaft S2, which, in turn, relays the power to an inner gear set IG1 installed on the second shaft S2, and the rear disc D2 is hereby rotated until a desired tool reaches the active location thereat. Shortly before this time, coil EC31 of valve SV3 is deactivated, and the hydraulic fluid passes through port B3 into valve V2 to push out the locating rod P2.

Meanwhile, the hydraulic fluid passing through throttle valve TV2 is restrained by the throttling gap of valve V2 to cause braking action on the motor M1 until cam C1 is locked in position by rod P2. At this point, the hydraulic fluid passes valve V2 to the check valve CV2 (the check valve CV4 is in the open state because of the piloting of valve V2) and activates the cylinder HC1 to engage together all the three toothed rings RC12, RC13 and RC11 of the three piece coupling device RC10. The rear disc D2 is now locked in position for processing operations.

Regardless of whether the front or the rear disc is rotated, all the discs are locked tight against the turret housing unit TH1 at completion of tool selection.

Figure 3A:
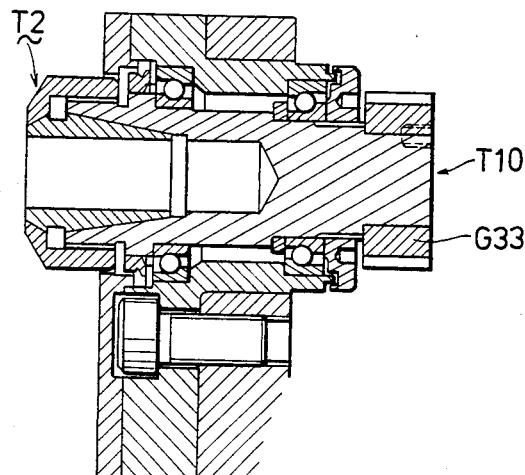
FIGS. 3A and 3B are illustrative sectional views of a revolving tool holder to be installed in the preferred embodiment of FIG. 1.
Figure 3B:
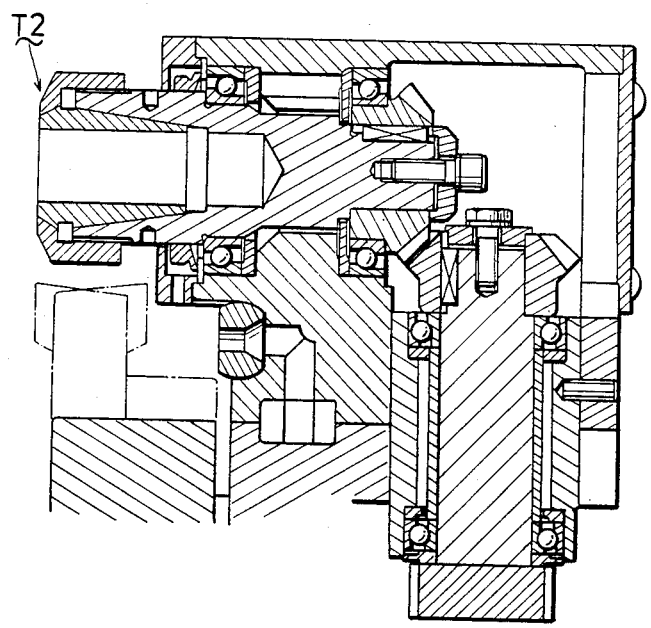

Referring to FIGS. 1, 3A and 3B, one can see how tool holder mounting hole MH1 on the rear disc D2 can be used for mounting an inductor device I10 for a touch sensor, a revolving tool T2 or a boring tool holder T3. Actuation of a revolving tool T2 is accomplished by addition of a gear train G31 and G32 inside the turret housing unit TH1 so that the gear G31 of the revolving tool holder T10 meshes with the gear G32 at the end of a tool selection cycle. This design allows revolving tool holders to be installed on any of the tool mounting holes MH1 provided on the rear disc D2.

In addition, provision can be made to install both OD and ID probes and a signal transmitting mechanism to accomplish in-process measurement of the workpiece. An OD probe PR1 is mounted on one of the tool positions of disc D1, and ID probe PR2 on the position originally vacated for elimination of interference with OD turning.

To measure the outside diameter of a workpiece, a signal from the probe PR1 is transmitted through inter disc contacts TT1 to TT2, then through the inductive signal transmission devices TT3 and TT4. Device TT4 is connected to the machine control unit by transmission cable. To measure the inside diameter of a workpiece, the signal can be transmitted directly through the inductive signal transmission devices TT3 and TT4.

The essential function of supplying cutting fluid to an active tool on tool turret is also provided in this invention.

Cutting fluid from a cutting fluid source FS1 passes through the first hollow shaft S1 to a directional orifice D01 which directs fluid to an active tool only when one of inlet holes IH1 on each of the tool positions is lined up with D01.

In order to direct cutting fluid to an active ID tool A2 on disc D2, a special supply hole SH1 is provided on disc D1 which, when positioned to take in cutting fluid, allows fluid to pass from opening OP1 on disc D1 to OP2 on disc D2, which in turn supplies fluid to the active tool A2. The opening OP2 is provided on each tool position on disc D2 but can receive cutting fluid only when it is lined up with the opening OP1. Therefore, cutting fluid is supplied only to a tool in the active position.

Having thus described the invention, it is to be understood that many embodiments thereof will suggest themselves without departing from the scope of the invention. Therefore, it is intended that the specification and drawings be interpreted as illustrative rather than in a limiting sense.

What is claimed is:

1. A twin disc type tool turret mechanism for CNC machines comprising:
   turret housing means
   front turret and a rear turret means mounted in said housing means, the two turrets being mounted so that they can be separately rotated for tool selection with said rear turret being axially fixed and said front turret being axially moveable;
   three-piece toothed coupling means having first, second and third coupling elements connected respectively to said front turret, rear turret and turret housing means for interlocking said front and rear turrets against rotation, said coupling elements being constructed so as to be unlocked upon axial movement of said front turret away from said rear turret by disengagement of the teeth of one of said first or second coupling elements from the teeth of said third coupling element and the other of said first or second coupling elements to release said turrets for rotation;
   a plurality of OD turning tools and a first workpiece measuring probe radially disposed on said front turret for outside cutting and measuring operations;
   annular body means on said rear turret adapted to receive a plurality of devices from the group consisting of boring tools, a second workpiece measuring probe, rotary tools for milling and drilling, end lathe tools and OD turning tools, which are axially disposed on a periphery of said annular body means;
   transmission means including a hydraulic cylinder device and a gearing system installed in said turret housing means and mechanically connected to both turrets for separately operating said turrets;
   a hydraulic system provided in said turret housing means and functionally coupled with said transmission means and said turrets for respectively controlling the rotation of said turrets;

inter-disc contact means and inductive signal transmission means respectively installed in said front and rear turrets for automatically measuring outside and inside diameters of a workpiece in process; and a cutting fluid supply system, including a passageway extending along the central axis of said turret housing means, for supplying cutting fluid to any tool in an active position during the operation of either turret;

whereby, both turrets can be separately operated without interference and tools can be operationally disposed in said turrets without increasing the turret size.

2. A twin disc type tool turret mechanism according to claim 1 wherein said three piece toothed coupling means comprises an external toothed ring defining said first coupling element, an internal toothed ring defining said second coupling element and a single sided toothed ring defining said third coupling element, said external toothed ring being fixed to said rear turret, said internal toothed ring being concentrically disposed within said external toothed ring and being fixed to said turret housing means, and said single sided toothed ring being meshed with said external and internal toothed rings and being fixed to said front turret, said single sided toothed ring being unmeshed from said external toothed ring and said internal toothed ring through axial movement of said front turret, to effect separate movement of said front and rear turrets.

3. A twin disc type tool turret mechanism according to claim 1 wherein said first workpiece measuring probe is installed at a fixed position on said front turret and measuring signals therefrom are transmitted through said inter-disc contact means and said inductive signal transmission means, said second workpiece measuring probe being disposed at any position on said rear turret, with measuring signals therefrom being transmitted through said inductive signal transmission means.

4. A twin disc type tool turret mechanism according to claim 1 wherein said cutting fluid system comprises a plurality of fluid supply channels arranged in such a way that cutting fluid for both turrets is supplied only to a tool in an active position.

5. A twin disc type tool turret mechanism for CNC machines comprising:

turret housing means;

front turret and a rear turret means mounted in said housing means, the two turrets having means for carrying tools and being mounted so that they can be separately rotated for tool selection and so that one of said turrets is axially moveable;

three-piece toothed coupling means having first, second and third coupling elements fixed respectively to said front turret, rear turret and turret housing means for interlocking said turrets against rotation, said coupling elements being constructed so as to be unlocked upon axial movement of said one of said turrets away from the other turret by disengagement of the teeth of one of said first or second coupling elements from the teeth of said third coupling element and the other of said first or second coupling elements, to release said turrets for rotation.

6. A twin disc type tool turret mechanism according to claim 5 wherein said three piece toothed coupling means comprises an external toothed ring defining said first coupling element, an internal toothed ring defining said second coupling element and a single sided toothed ring defining said third coupling element, said external toothed ring being fixed to said rear turret, said internal toothed ring being concentrically disposed within said external toothed ring and being fixed to said turret housing means, and said single sided toothed ring being meshed with said external and internal toothed rings and being fixed to said front turret, said single sided toothed ring being unmeshed from said external toothed ring and said internal toothed ring through axial movement of said one turret, to effect separate movement of said front and rear turrets.

* * * * *